United States Patent
Okazaki

(10) Patent No.: US 8,642,137 B2
(45) Date of Patent: *Feb. 4, 2014

(54) CERAMIC HONEYCOMB STRUCTURE AND ITS PRODUCTION METHOD

(75) Inventor: Shunji Okazaki, Miyako-gun (JP)

(73) Assignee: Hitachi Metals, Ltd., Tokyo (JP)

( * ) Notice: Subject to any disclaimer, the term of this patent is extended or adjusted under 35 U.S.C. 154(b) by 1103 days.

This patent is subject to a terminal disclaimer.

(21) Appl. No.: 12/600,765

(22) PCT Filed: May 19, 2008

(86) PCT No.: PCT/JP2008/059162
§ 371 (c)(1),
(2), (4) Date: Nov. 18, 2009

(87) PCT Pub. No.: WO2008/143225
PCT Pub. Date: Nov. 27, 2008

(65) Prior Publication Data
US 2010/0151185 A1    Jun. 17, 2010

(30) Foreign Application Priority Data

May 18, 2007  (JP) ................. 2007-133346

(51) Int. Cl.
*H05B 6/02*    (2006.01)
*B29L 31/60*   (2006.01)

(52) U.S. Cl.
USPC ........................... 427/543; 427/541; 427/591

(58) Field of Classification Search
USPC .......................................... 427/543, 591, 541
See application file for complete search history.

(56) References Cited

U.S. PATENT DOCUMENTS

| 5,221,497 A * | 6/1993 | Watanabe et al. ............... 516/83 |
| 5,629,067 A * | 5/1997 | Kotani et al. .................. 428/116 |
| 2006/0210764 A1* | 9/2006 | Yamada et al. ............... 428/116 |

FOREIGN PATENT DOCUMENTS

| JP | 01-317115 A   | 12/1989 |
| JP | 05-269388 A   | 10/1993 |
| JP | 2005-131800 A | 5/2005 |
| JP | 2005131800 A * | 5/2005 |
| JP | 2005-144284 A | 6/2005 |
| JP | 2006-255542 A | 9/2006 |
| JP | 2006-298745 A | 11/2006 |

OTHER PUBLICATIONS

Machine translation of Okazaki JP 2005-131800A.*

* cited by examiner

*Primary Examiner* — Dah-Wei Yuan
*Assistant Examiner* — Jose Hernandez-Diaz
(74) *Attorney, Agent, or Firm* — Sughrue Mion, PLLC

(57) ABSTRACT

A method for producing a ceramic honeycomb structure comprising a ceramic honeycomb body comprising large numbers of axially extending cells defined by cell walls, and an outer peripheral wall formed on an outer peripheral surface of the ceramic honeycomb body, comprising the steps of applying a coating material comprising elongated colloidal silica particles to the outer peripheral surface, and drying the coating material to form the outer peripheral wall.

5 Claims, 1 Drawing Sheet

CERAMIC HONEYCOMB STRUCTURE AND ITS PRODUCTION METHOD

CROSS REFERENCE TO RELATED APPLICATION

This application is a National Stage of International Application No. PCT/JP2008/059162 filed May 19, 2008, claiming priority based on Japanese Patent Application No. 2007-133346, filed May 18, 2007, the contents of all of which are incorporated herein by reference in their entirety.

FIELD OF THE INVENTION

The present invention relates to a ceramic honeycomb structure used for exhaust-gas-cleaning catalytic converters and particulate-matter-capturing filters, and its production method.

BACKGROUND OF THE INVENTION

To protect regional and global environment, exhaust-gas-cleaning catalyst carriers and particulate-matter-capturing filters comprising ceramic honeycomb structures are used to reduce harmful substances contained in exhaust gases discharged from automobile engines.

As shown in FIG. 2, a conventional ceramic honeycomb structure 20 comprises perpendicularly crossing cell walls 23 forming large numbers of flow paths 24 and an outer peripheral wall 21, and has a cross section perpendicular to its flow paths usually in substantially circular or elliptical shape. The outer peripheral wall 21 of the ceramic honeycomb structure 20 is held by grip members (not shown) formed by a metal mesh or a ceramic mat, etc. in a metal container (not shown), such that the ceramic honeycomb structure 20 does not move during operation.

The ceramic honeycomb structure 20 is produced by the steps of (1) blending starting materials such as a ceramic material (for instance, cordierite powder), a molding aid, a pore-forming material, etc. with water to prepare a moldable ceramic material, (2) extruding the moldable ceramic material through a honeycomb-shaped die to form a green body having a honeycomb structure integrally comprising cell walls 23 and an outer peripheral wall 21, and (3) drying and sintering the green body. With such steps, a ceramic honeycomb structure 20 having a predetermined shape and strength with fine pores in cell walls 23 is obtained.

For filters for cleaning exhaust gases discharged from diesel engines, a large ceramic honeycomb structure 20 as shown in FIG. 2, which has an outer diameter D of 150 mm or more and a length L of 150 mm or more with cell walls 23 as thin as 0.2 mm or less, may be used. In the production of such a large ceramic honeycomb structure 20 with thin cell walls, a green ceramic honeycomb body obtained by the extrusion of a moldable ceramic material has such insufficient strength that part of cell walls 23 at edges of an outer peripheral wall 21 of the green body are deformed by its own weight. The sintering of the deformed green body fails to provide a ceramic honeycomb structure 20 having desired strength.

To solve this problem, as shown in FIGS. 1(a) and 1(b), JP 5-269388 A discloses a honeycomb structure 10 having an outer peripheral wall 12 fixed to a ceramic honeycomb body 11, the outer peripheral wall 12 being produced by filling grooves 15 formed by cells 14a on the outer peripheral surface among large numbers of cells 14 defined by cell walls 13 with a paste-like coating material 12c obtained by blending cordierite particles and/or ceramic fibers and colloidal oxides (colloidal silica, colloidal alumina, etc.) as main components with water, and drying or drying and sintering it. JP 5-269388 A describes a method for forming the outer peripheral wall 12 by leaving the applied coating material 12c to stand for 24 hours in the air, and drying it at 90° C. for 2 hours.

In the drying method described in JP 5-269388 A that heating is conducted from outside, a surface layer 12s of the coating material 12c is first heated, and heat is gradually conducted to the inside 12n. Accordingly, the surface layer 12s of the coating material 12c is first dried, and then water in the portion 12n moves toward the surface, and evaporates from the already drying surface layer 12s, so that drying proceeds in the inner portion 12n. As a result, difference in the water content occurs between the surface layer 12s and inside portion 12n of the coating material 12c during a drying process, resulting in difference in drying shrinkage, which makes the coating material surface 12s vulnerable to cracks 16. Particularly when the outer peripheral wall is thick, or when a heating temperature is elevated to shorten the drying time, there is a large water content difference, resulting in further cracks 16. If the outer peripheral wall had such cracks, cracks would be starting points of breakage, undesirably reducing the strength of the ceramic honeycomb structure and causing heat shock cracking.

JP 2006-298745 A discloses a ceramic honeycomb structure 10 coated with a coating material 12c as shown in FIGS. 1(a) and 1(b). This reference describes that an outer peripheral wall formed by a slurry comprising crushed porcelain having a particle size of 15-75 μm and 26-34% by mass of water as a coating material 12c is resistant to cracking even by forced drying (drying with far-infrared rays and/or hot air), resulting in reduced production time.

However, particularly when a large ceramic honeycomb structure having an outer diameter D of 150 mm or more and a length L of 150 mm or more for diesel engines, etc. is produced, forced drying using far-infrared rays and/or hot air would be difficult to uniformly dry the outer peripheral wall 12 even though a coating material comprising the crushed porcelain described in JP 2006-298745 A were used, resulting in partially uneven drying. As a result, the outer peripheral wall 12 is provided with densified portions and less densified portions, materials move in the coating material during a drying process. It makes it likely that low-strength portions of the outer peripheral wall are cracked by small shock during handling, and that part of the outer peripheral wall is peeled. Thus, the outer peripheral wall is not strongly held by grip members in a metal container, so that the ceramic honeycomb structure may be broken by moving during operation.

Although cracks in the outer peripheral wall 12 may be mended by filling a ceramic material, for instance, as described in JP 2005-144284 A, a large number of cracks need many mending steps, resulting in extremely lowered production efficiency. Further, when spherical colloidal silica as colloidal oxide is added to the coating material, the outer peripheral wall 12 is not well bonded to ceramic particles (aggregates) in the coating material, so that the dried outer peripheral wall fails to have high strength.

OBJECTS OF THE INVENTION

Accordingly, the first object of the present invention is to provide a method for forming an outer peripheral wall on a ceramic honeycomb structure having large numbers of cells without suffering cracking in a coating material applied and dried.

The second object of the present invention is to provide a ceramic honeycomb structure having a high-strength outer peripheral wall, which is resistant to cracking by small shock during handling and by heat shock when used for catalytic converters and filters, and its production method.

DISCLOSURE OF THE INVENTION

As a result of intensive research in view of the above objects, the inventors have found that by forming an outer peripheral wall by a coating material comprising elongated colloidal silica particles, cracking can be suppressed when drying the coating material, and the resultant outer peripheral wall has high strength. The present invention has been completed based on such finding.

Thus, the method of the present invention method for producing a ceramic honeycomb structure comprising a ceramic honeycomb body comprising large numbers of axially extending cells defined by cell walls, and an outer peripheral wall formed on an outer peripheral surface of the ceramic honeycomb body, comprises the steps of applying a coating material containing elongated colloidal silica particles to the outer peripheral surface, and drying the coating material to form the outer peripheral wall.

The elongated colloidal silica particles preferably have an average particle size of 10-150 nm, and a (longer diameter/shorter diameter) ratio of 1.5-15.

The drying is preferably induction drying. Electromagnetic waves used for the induction drying are preferably microwaves or RF (radio frequency) waves. The induction drying is conducted preferably in a moist atmosphere.

The ceramic honeycomb structure of the present invention comprises a ceramic honeycomb body comprising large numbers of axially extending cells defined by cell walls, and an outer peripheral wall formed on an outer peripheral surface of the ceramic honeycomb body, the outer peripheral wall being formed by applying a coating material comprising elongated colloidal silica particles to the outer peripheral surface.

DESCRIPTION OF THE PREFERRED EMBODIMENTS

Figure 1A:
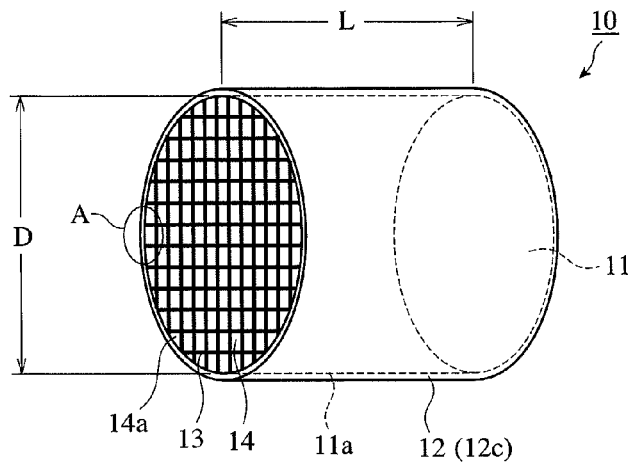
FIG. 1(a) is a perspective view showing one example of the ceramic honeycomb structures of the present invention.

[1] Production Method of Ceramic Honeycomb Structure

The method of the present invention for producing a ceramic honeycomb structure comprising a ceramic honeycomb body comprising large numbers of axially extending cells defined by cell walls, and an outer peripheral wall formed on an outer peripheral surface of the ceramic honeycomb body, comprises the steps of applying a coating material containing elongated colloidal silica particles to the outer peripheral surface, and drying the coating material to form the outer peripheral wall.

(1) Elongated Colloidal Silica Particles

As an inorganic binder for binding ceramic aggregates, elongated colloidal silica particles are used. When drying the applied coating material comprising elongated colloidal silica particles, the elongated colloidal silica particles are densely entangled and bonded to ceramic particles (aggregates) in the coating material. Accordingly, they effectively act as an inorganic binder, suppressing cracking during the drying of the coating material, and providing the outer peripheral wall with high strength. This effect is more remarkable when the elongated colloidal silica particles have an average particle size of 10-150 nm and a (longer diameter/shorter diameter) ratio of 1.5-15. The average particle size is measured by a dynamic light scattering method.

When the average particle size of the elongated colloidal silica particles is less than 10 nm, their bonding to ceramic particles in the coating material is too strong, resulting in the outer peripheral wall with too high strength and thus low heat shock resistance. On the other hand, when the particle size exceeds 150 nm, their bonding to ceramic particles in the coating material becomes weak, resulting in the outer peripheral wall with insufficient strength. The more preferred average particle size is 40-100 nm for the same reasons. When the elongated colloidal silica particles have a (longer diameter/shorter diameter) ratio of less than 1.5, there is no sufficient effect that the elongated colloidal silica particles are densely entangled and bonded to ceramic particles, resulting in the outer peripheral wall with insufficient strength. When the (longer diameter/shorter diameter) ratio exceeds 15, colloid particles have reduced strength, resulting in the dried outer peripheral wall with insufficient strength. The more preferred (longer diameter/shorter diameter) ratio is 2-12 for the same reasons.

The elongated colloidal silica is preferably Na-stabilized or, Na-removed, acidic colloidal silica. The concentration of elongated colloidal silica particles in the colloidal silica liquid is preferably 10-40% by mass. The viscosity of the colloidal silica liquid containing elongated colloidal silica particles is preferably 0.5-150 mPa·s, more preferably 0.8-120 mPa·s.

The elongated colloidal silica particles can be produced by the methods of JP 2001-150334 A, JP 2002-3212 A, etc. Particularly for the present invention, the colloidal silica is preferably produced by a liquid-phase synthesis method using the hydrolysis of alkoxides.

(2) Ceramic Particles

Used for ceramic particles in the coating material is preferably at least one selected from the group consisting of cordierite, alumina, mullite, silica, silicon carbide, titania and aluminum titanate, which has an average particle size of 5-60 μm. When the average particle size of the ceramic particles is less than 5 μm, the bonding of ceramic particles to colloidal silica particles is too strong, resulting in an outer peripheral wall with too high strength and thus low heat shock resistance. When the average particle size exceeds 60 μm, the bonding of ceramic particles to colloidal silica particles becomes weak, resulting in an outer peripheral wall with insufficient strength. The average particle size of the ceramic particles is more preferably 8-40 μm for the same reasons. When the cell walls of the ceramic honeycomb structure are mainly made of heat-resistant, low-thermal-expansion materials such as cordierite, aluminum titanate, etc., the ceramic particles in the coating material are more preferably the same cordierite, aluminum titanate or amorphous silica as in the cell walls, such that the outer peripheral wall has the same thermal expansion coefficient as that of the cell walls. The coating material may contain ceramic fibers, etc. in addition to ceramic particles and colloidal silica particles.

(3) Drying Method

Induction drying is a method of drying the coating material by direct heating by irradiating water in the coating material with electromagnetic waves such as microwaves to vibrate and rotate the electric dipoles of water molecules. Because this method can directly heat water molecules, a higher drying speed of the coating material is obtained than by thermal conduction heating, and water can be evaporated substantially uniformly without unevenness of drying. Therefore, drying occurs substantially simultaneously on the surface and inside, making it unlikely that the coating material surface has cracks.

Electromagnetic waves used for induction drying are preferably microwaves or RF (radio frequency) waves. Using microwaves or RF waves as an energy source, water molecules in the coating material can be efficiently heated, so that water is evaporated substantially uniformly and quickly from the coating material.

The induction drying is conducted preferably in a moist atmosphere. Induction can dry the applied coating material substantially uniformly from the surface and inside, but it is difficult to prevent a very surface portion of the coating material from prematurely drying. The induction drying in a moist atmosphere can prevent a very surface portion of the coating material from prematurely drying, thereby suppressing cracking. The induction drying is conducted in an atmosphere at preferably 50% RH or more, more preferably 70% RH or more. Although moisturizing may be conducted in the entire period from the start of induction drying to the end, moisturizing in 60% or more of the entire drying time can effectively prevent cracking. Less than 50% RH may not sufficiently prevent cracking in the dried outer peripheral wall surface.

[2] Ceramic Honeycomb Structure

Figure 1B:
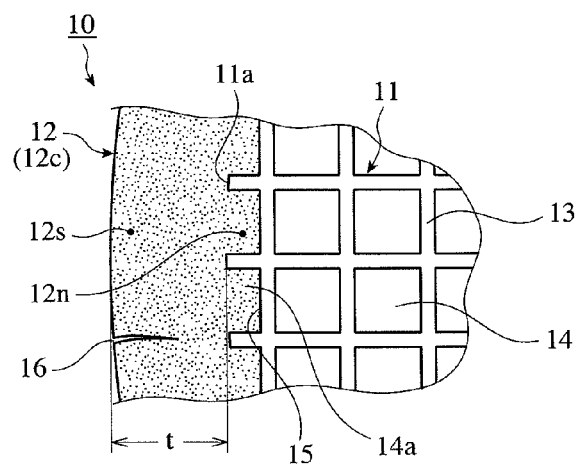
FIG. 1(b) is an enlarged cross-sectional view showing a portion A in FIG. 1(a).
Figure 2:
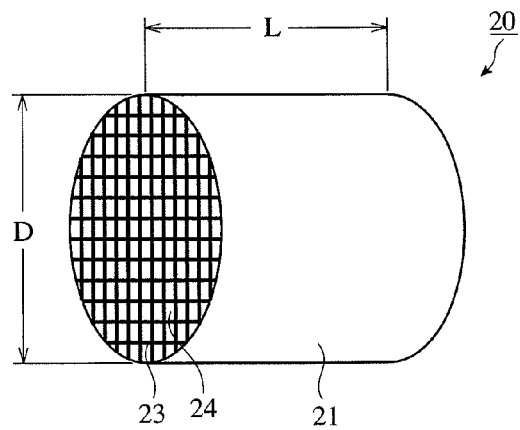
FIG. 2 is a perspective view showing one example of conventional ceramic honeycomb structures.

As shown in FIGS. 1(a) and 1(b), the ceramic honeycomb structure of the present invention comprises a ceramic honeycomb body 11 having large numbers of axially extending cells 14 defined by cell walls 13, and an outer peripheral wall 12 formed on an outer peripheral surface of the ceramic honeycomb body 11, axially extending grooves 15 formed by cells 14 on the outer peripheral surface of the ceramic honeycomb body 11 being filled with a coating material 12c to form the outer peripheral wall 12. For example, the ceramic honeycomb structure 10 has an outer diameter D of 280 mm and a length L of 300 mm, with cell walls 13 having a thickness of 0.2 mm and a pitch of 1.5 mm. An outer peripheral portion (not shown) of the ceramic honeycomb body 11 is removed by machining to form an exposed peripheral surface 11a, which is applied with a coating material 12c to form the outer peripheral wall 12. The cell walls 13 are preferably made of cordierite, and preferably formed by cordierite-forming material powder having a composition comprising 48-52% by mass of $SiO_2$, 33-37% by mass of $Al_2O_3$, and 12-15% by mass of MgO. The outer peripheral wall 12 is preferably formed by a coating material comprising cordierite particles, and elongated colloidal silica particles having an average particle size of 10-150 nm and a (longer diameter/shorter diameter) ratio of 1.5-15. Cordierite particles used for the coating material 12c preferably have an average particle size of about 30 μm.

Example 1

Kaolin powder, talc powder, silica powder and alumina powder were mixed to prepare cordierite-forming material powder comprising 50% by mass of $SiO_2$, 35% by mass of $Al_2O_3$ and 13% by mass of MgO, which was dry-mixed with methylcellulose and hydroxypropyl methylcellulose as binders, a lubricant, and graphite as a pore-forming material. Thereafter, blending was conducted with water added to prepare a plasticized moldable ceramic material. This moldable ceramic material was extrusion-molded, cut to a predetermined length to obtain a green honeycomb structure integrally comprising a peripheral portion and cell walls. After the peripheral portion 11a was removed from this green body by machining to form an exposed peripheral surface 11a, the green body was dried and sintered to obtain a cordierite honeycomb body 11 having an outer diameter D of 280 mm, a length L of 300 mm, a cell wall thickness of 0.3 mm, a cell pitch of 1.5 mm, porosity of 60%, and an average pore size of 20 μm.

100 parts by mass of cordierite particles having an average particle size of 20 μm were mixed with 20 parts by mass of 20-%-by-mass colloidal silica containing of elongated colloidal silica particles having an average particle size of 40 nm and a (longer diameter/shorter diameter) ratio of 5, and 1.5 parts by mass of methylcellulose as an organic binder, and water, to prepare a paste-like coating material (water content: about 30% by mass) applicable to the honeycomb body 11. This coating material was applied to an exposed peripheral surface 11a of the ceramic honeycomb body 11 to a thickness of 2.5 mm, left to stand for 24 hours in the air, and then dried by hot air at 90° C. for 2 hours to produce a ceramic honeycomb structure 10 provided with an outer peripheral wall. The dried outer peripheral wall was as thick as 2.0 mm.

Examples 2 and 3

The ceramic honeycomb structures of Examples 2 and 3 were produced in the same manner as in Example 1 except for changing the amount of the 20-%-by-mass colloidal silica containing elongated colloidal silica particles to 10 and 30 parts by mass, respectively, based on 100 parts by mass of cordierite particles having an average particle size of 20 μm.

Examples 4-8

Ceramic honeycomb structures each provided with an outer peripheral wall were produced in the same manner as in Example 1 except for changing the average particle size and (longer diameter/shorter diameter) ratio of colloidal silica particles, and the temperature of hot air drying as shown in Table 1.

Example 9

A ceramic honeycomb structure provided with an outer peripheral wall was produced in the same manner as in Example 1 except for using amorphous silica particles having an average particle size of 18 μm in place of cordierite particles.

Example 10

A ceramic honeycomb structure provided with an outer peripheral wall was produced in the same manner as in Example 1, except for conducting the drying of a coating material in a microwave-drying apparatus (output: 30 kW, and frequency: 2450 MHz) until the water content in the coating material became 5% by mass or less. The microwave-drying apparatus comprises a drying chamber for containing pluralities of green bodies, a microwave generator for supplying microwaves to the drying chamber, and a means for moisturizing an atmosphere in the drying chamber. The moisturizing means comprises a pipe extending from a boiler and open at the drying chamber, from which steam is ejected into the drying chamber to adjust the atmosphere therein at 80° C. or higher and 60% RH or more. In Example 10, microwave drying was conducted without moisturizing.

Example 11

A ceramic honeycomb structure provided with an outer peripheral wall was produced in the same manner as in Example 10 except for conducting the drying of a coating material by a drying apparatus using RF waves (radio frequency: 13.56 MHz) in place of microwaves.

Example 12

A ceramic honeycomb structure provided with an outer peripheral wall was produced in the same manner as in Example 10 except for conducting the drying of a coating material with microwaves while keeping the humidity of an atmosphere in the drying apparatus at 70% or more.

Examples 13-19

Ceramic honeycomb structures each provided with an outer peripheral wall were produced in the same manner as in Example 12 except for changing the ceramic particles and the colloidal silica particles as shown in Table 1.

Comparative Examples 1-4

Ceramic honeycomb structures each provided with an outer peripheral wall were produced in the same manner as in Example 1 except for using spherical colloidal silica particles having average particle sizes (dynamic light scattering method) shown in Table 1 in place of the elongated colloidal silica particles as binders, and drying the coating materials under the drying conditions shown in Table 1.

Evaluation

In Examples 1-19 and Comparative Examples 1-4, the frequency of cracking when drying the coating material, and the strength and heat shock resistance of the outer peripheral wall formed were evaluated by the flowing methods. Their results are shown in Table 1.

Evaluation of frequency of cracking when drying coating material

The frequency of cracking when drying the coating material was evaluated by observing the dried outer peripheral wall by the naked eye. In each of Examples and Comparative Examples, observation was conducted on three samples and evaluated by the following standard.

Excellent No cracking at all in any of three samples.
Good At least one of three samples had cracks of less than 3 mm in length.
Fair At least one of three samples had cracks of 3 mm or more and less than 5 mm in length.
Poor At least one of three samples had cracks of 5 mm or more in length.

Evaluation of Strength

The strength of the outer peripheral wall was evaluated by the hardness of the outer peripheral wall. Using a B-type durometer hardness meter (Asker B-type Hardness Meter for Rubber available from Kobunshi Keiki Co., Ltd.) according to ASTM D2240, the hardness of the outer peripheral wall 12 of each honeycomb structure 10 was measured by pushing an indenter of the hardness meter onto a surface of the outer peripheral wall 12. The measured values of hardness were evaluated according to the following standards.

Excellent 90 or more.
Good 85 or more and less than 90.
Fair 80 or more and less than 85.
Poor less than 80.

Evaluation Of Heat Shock Resistance

The heat shock resistance was evaluated by heating each honeycomb structure 10 at 500° C. for 30 minutes in an electric furnace, and then rapidly cooling it to room temperature to observe cracks by the naked eye. When no cracks were found, the same test was conducted with the electric furnace temperature elevated by 25° C., and this operation was repeated until cracking occurred. Each sample was tested three times to determine the difference between a temperature at which cracking occurred in the outer peripheral wall of at least one honeycomb structure and room temperature (heating temperature–room temperature) as a heat shock resistance temperature, which was evaluated by the flowing standard.

Excellent The heat shock resistance temperature was 650° C. or higher.
Good The heat shock resistance temperature was 600° C. or higher and lower than 650° C.
Fair The heat shock resistance temperature was 550° C. or higher and lower than 600° C.
Poor The heat shock resistance temperature was lower than 550° C.

The total evaluation was determined by cracking, hardness and heat shock resistance.

Excellent At least one of them was evaluated as Excellent.
Good Two or more of them were evaluated as Good.
Fair Two or more of them were evaluated as Fair.
Poor At least one of them was evaluated as Poor.

The results are shown in Table 1.

TABLE 1

| | Ceramic Particles | | 20-%-By-Mass Colloidal Silica | | | |
|---|---|---|---|---|---|---|
| | | | | Shape of | | |
| No. | Type | Average Particle Size (μm) | Amount[1] (parts by mass) | Colloidal Silica Particles | Average Particle Size[2] (nm) | L/D[3] |
| Example 1 | Cordierite | 20 | 20 | Elongated | 40 | 5 |
| Example 2 | Cordierite | 20 | 10 | Elongated | 40 | 5 |
| Example 3 | Cordierite | 20 | 30 | Elongated | 40 | 5 |
| Example 4 | Cordierite | 20 | 20 | Elongated | 10 | 3 |
| Example 5 | Cordierite | 20 | 20 | Elongated | 63 | 5 |
| Example 6 | Cordierite | 20 | 20 | Elongated | 84 | 7 |
| Example 7 | Cordierite | 20 | 20 | Elongated | 52 | 2 |
| Example 8 | Cordierite | 20 | 20 | Elongated | 52 | 14 |
| Example 9 | Amorphous Silica | 18 | 20 | Elongated | 40 | 5 |
| Example 10 | Cordierite | 20 | 20 | Elongated | 40 | 5 |

TABLE 1-continued

| | | | | | | |
|---|---|---|---|---|---|---|
| Example 11 | Cordierite | 20 | 20 | Elongated | 40 | 5 |
| Example 12 | Cordierite | 20 | 20 | Elongated | 40 | 5 |
| Example 13 | Amorphous Silica | 18 | 20 | Elongated | 40 | 5 |
| Example 14 | Cordierite | 15 | 20 | Elongated | 10 | 3 |
| Example 15 | Cordierite | 30 | 20 | Elongated | 63 | 5 |
| Example 16 | Amorphous Silica | 13 | 20 | Elongated | 10 | 3 |
| Example 17 | Amorphous Silica | 35 | 20 | Elongated | 63 | 5 |
| Example 18 | Cordierite | 20 | 20 | Elongated | 5 | 15 |
| Example 19 | Cordierite | 20 | 20 | Elongated | 84 | 7 |
| Comparative Example 1 | Cordierite | 20 | 20 | Spherical | 80 | — |
| Comparative Example 2 | Cordierite | 20 | 20 | Spherical | 3 | — |
| Comparative Example 3 | Cordierite | 20 | 20 | Spherical | 300 | — |
| Comparative Example 4 | Cordierite | 20 | 20 | Spherical | 300 | — |

| | | Evaluation Results | | | |
|---|---|---|---|---|---|
| No. | Drying Method | Cracking | Hardness | Heat Shock Resistance | Total Evaluation |
| Example 1 | 90° C. Hot Air (2 hours) | Fair | Good | Fair | Fair |
| Example 2 | 90° C. Hot Air (2 hours) | Fair | Fair | Good | Fair |
| Example 3 | 90° C. Hot Air (2 hours) | Fair | Good | Fair | Fair |
| Example 4 | 100° C. Hot Air (2 hours) | Fair | Good | Fair | Fair |
| Example 5 | 120° C. Hot Air (2 hours) | Fair | Good | Fair | Fair |
| Example 6 | 110° C. Hot Air (2 hours) | Fair | Fair | Fair | Fair |
| Example 7 | 90° C. Hot Air (2 hours) | Fair | Fair | Fair | Fair |
| Example 8 | 90° C. Hot Air (2 hours) | Fair | Fair | Fair | Fair |
| Example 9 | 90° C. Hot Air (2 hours) | Fair | Good | Good | Fair |
| Example 10 | Microwaves | Good | Good | Good | Good |
| Example 11 | RF Waves | Good | Good | Good | Good |
| Example 12 | Microwaves + Moisturizing (70% RH) | Excellent | Excellent | Good | Excellent |
| Example 13 | Microwaves + Moisturizing (70% RH) | Excellent | Excellent | Excellent | Excellent |
| Example 14 | Microwaves + Moisturizing (70% RH) | Excellent | Excellent | Good | Excellent |
| Example 15 | Microwaves + Moisturizing (70% RH) | Excellent | Good | Excellent | Excellent |
| Example 16 | Microwaves + Moisturizing (70% RH) | Excellent | Excellent | Good | Excellent |
| Example 17 | Microwaves + Moisturizing (70% RH) | Excellent | Good | Excellent | Excellent |
| Example 18 | Microwaves + Moisturizing (70% RH) | Good | Good | Fair | Good |
| Example 19 | Microwaves + Moisturizing (70% RH) | Good | Fair | Good | Good |
| Comparative Example 1 | 90° C. Hot Air (2 hours) | Poor | Fair | Fair | Poor |
| Comparative Example 2 | Microwaves | Good | Fair | Poor | Poor |
| Comparative Example 3 | Microwaves | Good | Poor | Fair | Poor |
| Comparative Example 4 | Microwaves + Moisturizing (70% RH) | Good | Poor | Fair | Poor |

Note:
(1)Parts by mass of the 20-%-by-mass colloidal silica based on 100 parts by mass of the ceramic particles.
(2)Average particle size measured by a dynamic light scattering method.
(3)L/D means a ratio of longer diameter/shorter diameter.

It is clear from Table 1 that because the ceramic honeycomb structures 10 of Examples 1-19 had high-strength outer peripheral walls 12 with few cracks generated when drying the coating materials 12c, they had excellent heat shock resistance. Particularly because drying in a moist atmosphere was conducted together with microwave drying in Examples 12-19, their coating materials were prevented from prematurely drying from the surface, thereby suppressing the generation of cracks 16 during drying. On the other hand, the ceramic honeycomb structures of Comparative Examples 1-4 had many cracks generated when drying the coating material 12c, resulting in insufficient strength and thus low heat shock resistance.

EFFECT OF THE INVENTION

The method of the present invention can suppress cracking when drying the coating material, producing ceramic honeycomb structures not suffering breakage and cracking due to heat shock when used for catalytic converters and filters. Further, it provides outer peripheral walls with high strength, thereby producing ceramic honeycomb structures not suffering cracking by small shock during handling.

What is claimed is:

1. A method for producing a ceramic honeycomb structure comprising a ceramic honeycomb body comprising axially extending cells defined by cell walls, and an outer peripheral wall formed on an outer peripheral surface of said ceramic honeycomb body, comprising the steps of applying a coating material containing elongated colloidal silica particles to said outer peripheral surface, and drying the coating material to form said outer peripheral wall, wherein said elongated colloidal silica particles have an average particle size of 10-63 nm, and a (longer diameter/shorter diameter) ratio of 1.5-15, and wherein said drying is induction drying conducted in an atmosphere at 70% relative humidity or more.

2. The method for producing a ceramic honeycomb structure according to claim 1, wherein electromagnetic waves used for said induction drying are microwaves or RF (radio frequency) waves.

3. The method for producing a ceramic honeycomb structure according to claim 1, wherein said ceramic honeycomb structure has an outer diameter of 150 mm or more and a length of 150 mm or more.

4. The method for producing a ceramic honeycomb structure according to claim 1, wherein said drying occurs substantially simultaneously on the surface of the coating material and inside the coating material.

5. The method for producing a ceramic honeycomb structure according to claim 1, said coating material further comprises ceramic particles having an average particle size of 5-18 μm.

* * * * *